United States Patent
Müller

(10) Patent No.: US 11,153,789 B2
(45) Date of Patent: Oct. 19, 2021

(54) METHOD, NETWORK NODE AND USER EQUIPMENT OF A WIRELESS NETWORK FOR HANDLING A USER EQUIPMENT

(71) Applicant: Telefonaktiebolaget LM Ericsson (publ), Stockholm (SE)

(72) Inventor: Walter Müller, Upplands Väsby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 139 days.

(21) Appl. No.: 16/613,236

(22) PCT Filed: May 16, 2017

(86) PCT No.: PCT/SE2017/050507
§ 371 (c)(1),
(2) Date: Nov. 13, 2019

(87) PCT Pub. No.: WO2018/212690
PCT Pub. Date: Nov. 22, 2018

(65) Prior Publication Data
US 2020/0128448 A1    Apr. 23, 2020

(51) Int. Cl.
*H04W 36/00* (2009.01)
*H04W 76/11* (2018.01)
*H04W 36/30* (2009.01)

(52) U.S. Cl.
CPC ... *H04W 36/0022* (2013.01); *H04W 36/0058* (2018.08); *H04W 36/0094* (2013.01); *H04W 36/30* (2013.01); *H04W 76/11* (2018.02)

(58) Field of Classification Search
CPC ......... H04W 36/0005; H04W 36/0022; H04W 36/0027; H04W 36/0058; H04W 36/0061;
(Continued)

(56) References Cited

U.S. PATENT DOCUMENTS

2014/0328318 A1   11/2014   Sundararajan et al.

FOREIGN PATENT DOCUMENTS

| CN | 1402486 A | 3/2003 |
|---|---|---|
| CN | 103404067 A | 11/2013 |

(Continued)

OTHER PUBLICATIONS

Hoymann, Christian, et al., "A Lean Carrier for LTE", LTE Technology Update: Part 2; IEEE Communications Magazine, Feb. 2013, pp. 74-80.

(Continued)

*Primary Examiner* — Matthew W Genack
(74) *Attorney, Agent, or Firm* — Murphy, Bilak & Homiller, PLLC

(57) ABSTRACT

A method is disclosed performed by a first network node (110) of a wireless communication system (100) for handling of a UE (150) connected to the first network node (110), wherein a second network node (120) of the communication system (100) has a first transmission resource (130) for wireless transmission using a first access technology and a second transmission resource (140) for wireless transmission using a second access technology. The first and the second transmission resources (130, 140) are collocated. The method comprises receiving, from the UE (150), an indication of fulfilled transmission condition for transmission from the second transmission resource (140) to the UE (150), the indication being based on a transmission quality measurement performed by the UE (150) on a wireless signal transmitted by the first transmission resource (130), and determining whether the UE (150) is to be served by the second access technology transmission resource (140) of the second network node (120). The method further comprises, sending, based on the result of the determining, an instruction to the UE (150) to prepare for receiving data in a carrier (Continued)

bandwidth of the second access technology, and sending an instruction to the second network node (120) to prepare for transmitting data from the second access technology transmission resource (140) at the carrier bandwidth of the second access technology.

26 Claims, 9 Drawing Sheets

(58) Field of Classification Search
CPC ......... H04W 36/0069; H04W 36/0072; H04W 36/0077; H04W 36/0085; H04W 36/0088; H04W 36/0094; H04W 36/30; H04W 72/02; H04W 72/04; H04W 76/11; H04W 76/15

See application file for complete search history.

(56) References Cited

FOREIGN PATENT DOCUMENTS

| CN | 104219034 A | 12/2014 |
|----|-------------|---------|
| CN | 105191404 A | 12/2015 |
| CN | 105379395 A | 3/2016 |
| CN | 105594137 A | 5/2016 |
| CN | 106233780 A | 12/2016 |
| EP | 2879306 A1 | 6/2015 |

OTHER PUBLICATIONS

Unknown, Author, "LTE handover preparation for mobility enhancements", 3GPP TSG RAN WG2 Meeting #94, R2-163973, Nanjing, China,, May 23-27, 2016, pp. 1-3.

Unknown, Author, "NR/LTE tight interworking: CP requirements on Mobility and Dual Connectivity", 3GPP TSG-RAN WG2 #94, Tdoc R2-163993, Nanjing, China,, May 23-27, 2016, pp. 1-5.

METHOD, NETWORK NODE AND USER EQUIPMENT OF A WIRELESS NETWORK FOR HANDLING A USER EQUIPMENT

TECHNICAL FIELD

The present disclosure relates generally to methods, network nodes and user equipments for handling a user equipment connected to a wireless communication network. More specifically, the disclosure relates to methods, network nodes and user equipments for finding candidate channels for serving a user equipment.

BACKGROUND

As wireless communication technology evolves, newer wireless access technologies are to be merged with already existing wireless access technologies. As of today, the Next Generation access technology known as New Radio or New Radio Access Technology, NR, is to be merged with the prevalent Long Term Evolution, LTE, access technology.

The first deployment of NR will probably use an LTE carrier as primary Cell i.e. anchor, also called primary communication channel or resource, for providing wireless access to a UE, and use a NR carrier as secondary Cell, i.e. data boosting carrier, also called secondary communication channel or resource. The method for such aggregation of different access resources discussed currently in 3GPP is to using Dual Connectivity for aggregating LTE and NR carriers, called Enhanced UMTS Terrestrial Radio Access—New Radio, EUTRA-NR, Dual Connectivity in 3GPP.

When performing such carrier or channel aggregation, it is needed to determine whether there are nearby candidate cells served by a candidate base stations that a UE connected to a serving base station could connect to, in order to find a secondary cell for the UE. The LTE standard supports a number of possible transmission schemes that allow a UE to measure on signals from candidate base stations, even though most radio resources of such candidate base stations are not powered on. One such transmission scheme is for candidate base stations to transmit a discovery or pilot signal, such as a Discovery Reference Signal, DRS, which is to be transmitted periodically. The DRS contains a physical cell identity, PCI, which comprises a primary synchronization signal, PSS, and a secondary synchronization channel, SSS, and a cell-specific reference signal, CRS, and optionally a Channel State Information Reference Signal, CSI-RS that are sent during bursts. The UE will search for such DRS at preset time points corresponding to when they are sent, detect them, evaluate transmission quality of the received signals and report the transmission quality along with the PC's of the candidate base stations to its serving base station. The communication network, e.g. the serving base station, then uses a database or look-up table to determine the network identity and IP address of the candidate base stations and the detected Cell based on the received PCI. In case the candidate base station is an external node without a NW connection to the serving base station, the communication network may also initiate a connection setup using the IP address for the candidate base station from the database or table.

A current solution in LTE for finding candidate cells run by candidate base stations for carrier aggregation is to assume overlapping coverage for the candidate cell with the coverage of a primary cell provided by the serving base station and set-up the secondary cell on the candidate base station blindly (without measurements) and start using radio resources from that secondary cell, on a different carrier than the primary cell used by the serving base station. However, the assumption that the candidate cell is overlapping the primary cell is only true if the primary and the secondary cell use roughly the same frequency and power and are collocated to the same site, but it is not true when small LTE cells are deployed on high frequency and/or when the candidate cell is not co-located with the serving cell.

Another solution, which can be used when the candidate cell is not co-located with the serving cell and when the candidate cell does not use the same frequency as the serving cell, is to configure the UE with measurement gaps when communication with the serving cell and let the UE search for candidate cells on other carrier frequencies in the measurement gaps. The drawback with such a solution is that it may take 2-5 seconds for a UE to find a strong candidate cell on another carrier frequency and report the candidate cell to the network, and by that time the data could have already been delivered to the UE using no aggregation, i.e. by only using the communication via the serving cell. Further, if such measurement performed in gaps are to be done on another radio access technology than the one used by the serving cell, the candidate cell search and measurement may take even longer time.

Consequently, there is a need for a method of quickly finding a secondary cell for performing carrier aggregation to a UE. Such a method is of certain importance when carrier aggregation is to be performed using a first access technology for the primary cell and a second access technology for the secondary cell.

SUMMARY

It is an object of the invention to address at least some of the problems and issues outlined above. It is an object of embodiments of the invention to quickly find candidate cells for serving a UE, candidate cells that are provided by a different radio access technology than the radio access technology providing a serving cell currently serving the UE. It is possible to achieve these objects and others by using a method and an apparatus as defined in the attached independent claims.

According to one aspect, a method is provided performed by a first network node of a wireless communication system for handling of a UE connected to the first network node, wherein a second network node of the communication system has a first transmission resource for wireless transmission using a first access technology and a second transmission resource for wireless transmission using a second access technology. The first and the second transmission resources are collocated. The method comprises receiving, from the UE, an identity of the second network node and an indication of a fulfilled transmission condition for transmission from the second transmission resource to the UE, the indication being based on a transmission quality measurement performed by the UE on a wireless signal transmitted by the first transmission resource, and determining, based on the received second network node identity and on the received indication, whether the UE is to be served by the second access technology transmission resource of the second network node. The method further comprises, sending, based on the result of the determining, an instruction to the UE to prepare for receiving data in a carrier bandwidth of the second access technology, and sending an instruction to the second network node to prepare for transmitting data from the second access technology transmission resource at the carrier bandwidth of the second access technology.

According to another aspect, a method is provided performed by a UE wirelessly connected to a first network node of a wireless communication network, wherein a second network node of the communication network has a first transmission resource for wireless transmission using a first access technology and a second transmission resource for wireless transmission using a second access technology. The first and the second transmission resources are collocated. The UE further has capabilities for receiving signals of the first access technology and for receiving signals of the second access technology. The method comprises measuring transmission quality on a wireless signal received from the first transmission resource of the second network node, and determining whether the measured transmission quality fulfils a transmission condition for transmission from the second transmission resource of the second network node to the UE. The method further comprises sending to the first network node, based on the result of the determining, an identity of the second network node and an indication of fulfilled transmission condition for transmission from the second transmission resource of the second network node to the UE, and receiving an instruction from the first network node to prepare for receiving data in a carrier bandwidth of the second access technology.

According to another aspect, a first network node is provided operable in a wireless communication system configured for handling a UE connected to the first network node, wherein a second network node has a first transmission resource for wireless transmission using a first access technology and a second transmission resource for wireless transmission using a second access technology. The first and the second transmission resources are collocated. The first network node comprises a processor and a memory. The memory contains instructions executable by said processor, whereby the first network node is operative for receiving, from the UE, an identity of the second network node, and an indication of a fulfilled transmission condition for transmission from the second transmission resource to the UE, the indication being based on a transmission quality measurement performed by the UE on a wireless signal transmitted by the first transmission resource. The first network node is further operative for determining, based on the received second network node identity and on the received indication, whether the UE is to be served by the second access technology transmission resource of the second network node, and based on the result of the determining, for sending an instruction to the UE to prepare for receiving data in a carrier bandwidth of the second access technology, and for sending an instruction to the second network node to prepare for transmitting data from the second access technology transmission resource at the carrier bandwidth of the second access technology.

According to another aspect, a UE is provided configured to be wirelessly connected to a first network node of a wireless communication network, wherein a second network node of the communication network has a first transmission resource for wireless transmission using a first access technology and a second transmission resource for wireless transmission using a second access technology. The first and the second transmission resources are collocated. The UE has capabilities for receiving signals of the first access technology and for receiving signals of the second access technology. The UE comprises a processor and a memory. The memory contains instructions executable by said processor, whereby the UE is operative for measuring transmission quality on a wireless signal received from the first transmission resource of the second network node, and determining whether the measured transmission quality fulfils a transmission condition for transmission from the second transmission resource of the second network node to the UE. The UE is further operative for sending, to the first network node based on the result of the determining, an identity of the second network node and an indication of fulfilled transmission condition for transmission from the second transmission resource of the second network node to the UE, and receiving an instruction from the first network node to prepare for receiving data in a carrier bandwidth of the second access technology.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to time-efficiently find a candidate cell for serving a UE that is currently served by a serving cell, when the serving network node providing network coverage to the serving cell uses a first radio access technology and the candidate network node providing network coverage to the candidate cell uses a second radio access technology. This is achieved by at the candidate network node collocating first transmission resources for the first access technology with second transmission resources for the second access technology. Thereafter, the UE is instructed by the serving network node to measure on signals sent by the first transmission resources of the candidate network node and to send an indication to the serving network node of a fulfilled transmission condition for the second transmission resource. The serving network node then determines whether the UE is to be served by the second transmission resource 140 when the signal of the first transmission resource is above a certain transmission condition value. The certain transmission condition value is set to reflect a relation between the determined transmission condition of the first access technology and a corresponding transmission condition for the second access technology. The transmission condition value may be sent to the UE so that UE uses it for determining the indication that it is to send to the serving network node, or the UE only sends the measurement value as the indication and the value is instead used by the serving network node in the determining.

Figure 1:
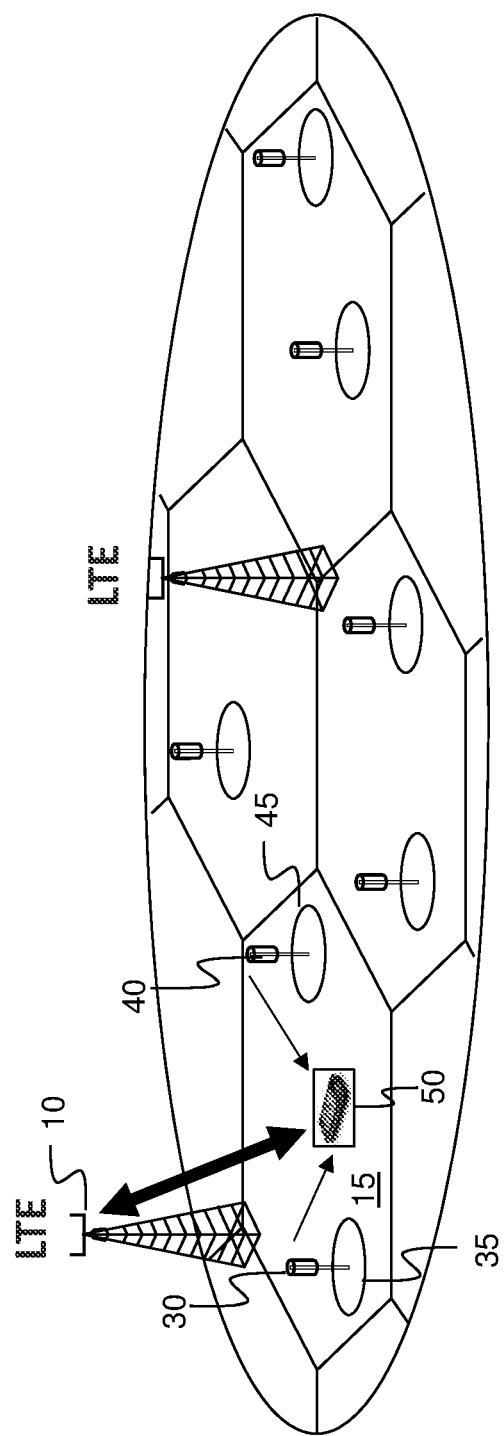
FIG. 1 is a schematic block diagram illustrating a communication scenario according to the prior art.

FIG. 1 shows a communication network according to prior art. In such a network, an LTE macro base station 10 provides LTE radio coverage to a first cell 15, and a first and a second NR small base station 30, 40 provides NR radio coverage to a first and second small cell 35, 45, respectively. In such a network, a UE 50 that is capable of receiving both LTE and NR signals is connected to the LTE base station 10 as its serving base station, on a primary cell. When the UE 50 needs to transmit or receive a burst of data, the UE uses transmission gaps at the transmission from the serving base station 10 to search for candidate NR small cells, by measuring on signals sent from the NR small base stations. As the NR small base stations transmit their signals using NR, the UE needs to change from receiving signals using its LTE receiver capabilities to receiving signals using its NR receiver capabilities. Such a change followed by listening and determining a candidate NR cell takes rather long time. As a result, the UE might already have delivered the data to be sent to the UE using the LTE macro base station only.

Figure 2:
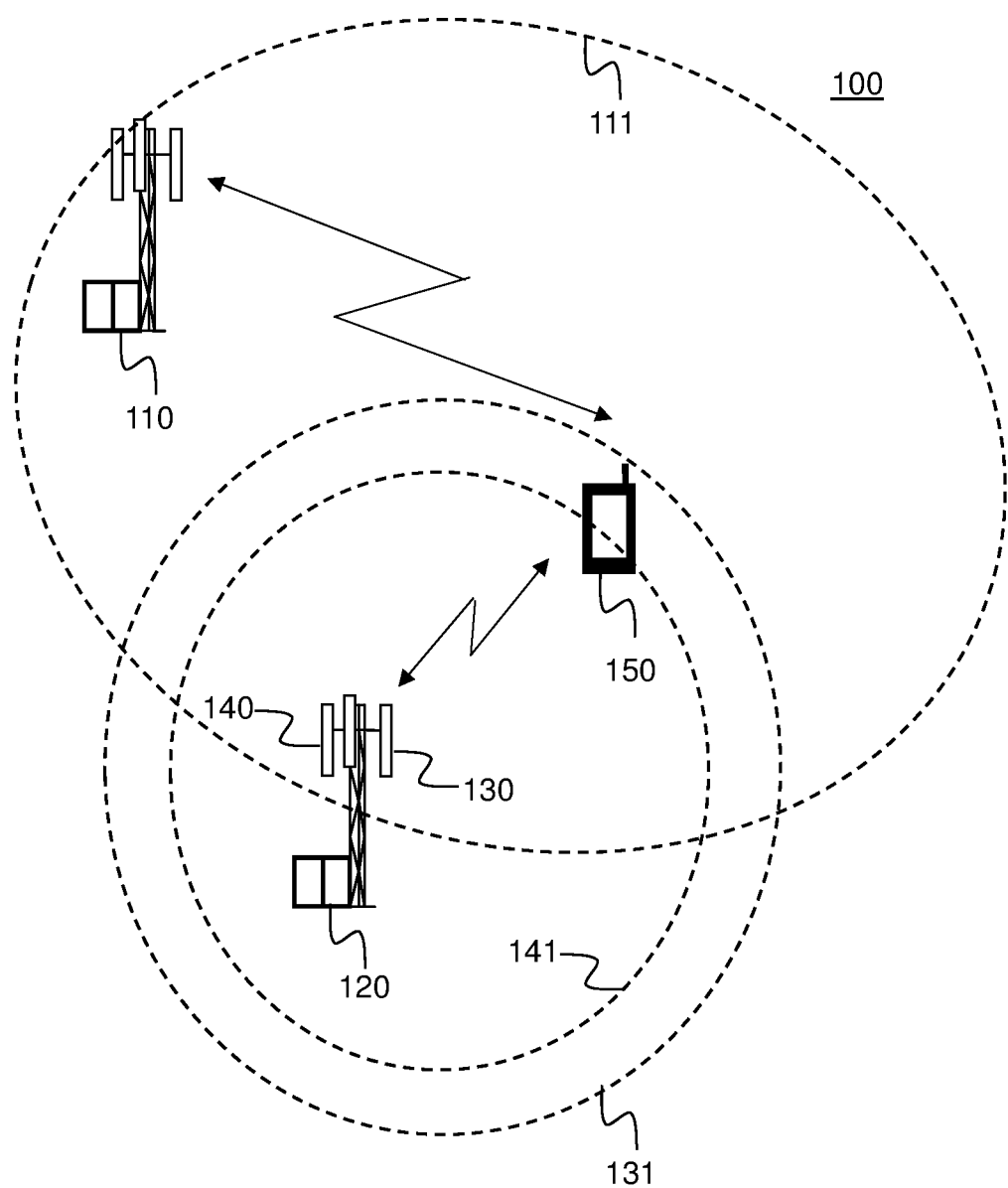
FIG. 2 is a schematic block diagram illustrating a communication scenario in which embodiments of the present invention may be used.

FIG. 2 shows a communication network 100 according to the invention. The communication network 100 comprises a first network node 110 providing radio coverage in a first geographical cell 111 using a first radio access technology. The communication network 100 further comprises a second network node 120. The second network node 120 has a first transmission resource 130 for wireless transmission using the first access technology, the first transmission resource 130 providing radio coverage in a second geographical cell 131. The second network node 120 also has a second transmission resource 140 for wireless transmission using a second access technology, the second transmission resource 140 providing radio coverage in a third geographical cell 141. The first and second access technologies are mutually different wireless transmission technologies. According to an embodiment, the first access technology is LTE and the second access technology is NR. According to another embodiment, the first access technology is NR and the second access technology is LTE. The first and second transmission resources 130, 140 are collocated, which may mean that the antenna or antennas used for transmission for both first and second access technologies are mounted on the same mast and pointing in roughly the same direction. In the FIG. 2, the first and second transmission resources are illustrated as different antennas. However, the collocated first and second transmission resources 130, 140 may either use the same transmission antenna or different transmission antennas. The first transmission resource and the second transmission resource have mutually different transmission and reception units at the second network node for providing the different wireless signals to be sent from the antenna(s). There is also a UE 150 situated in a geographical area covered by the communication network 100. The UE has capabilities for receiving signals of both the first and the second access technology. The UE has capabilities for transmitting signals using both the first and the second radio access technology.

Figure 3:
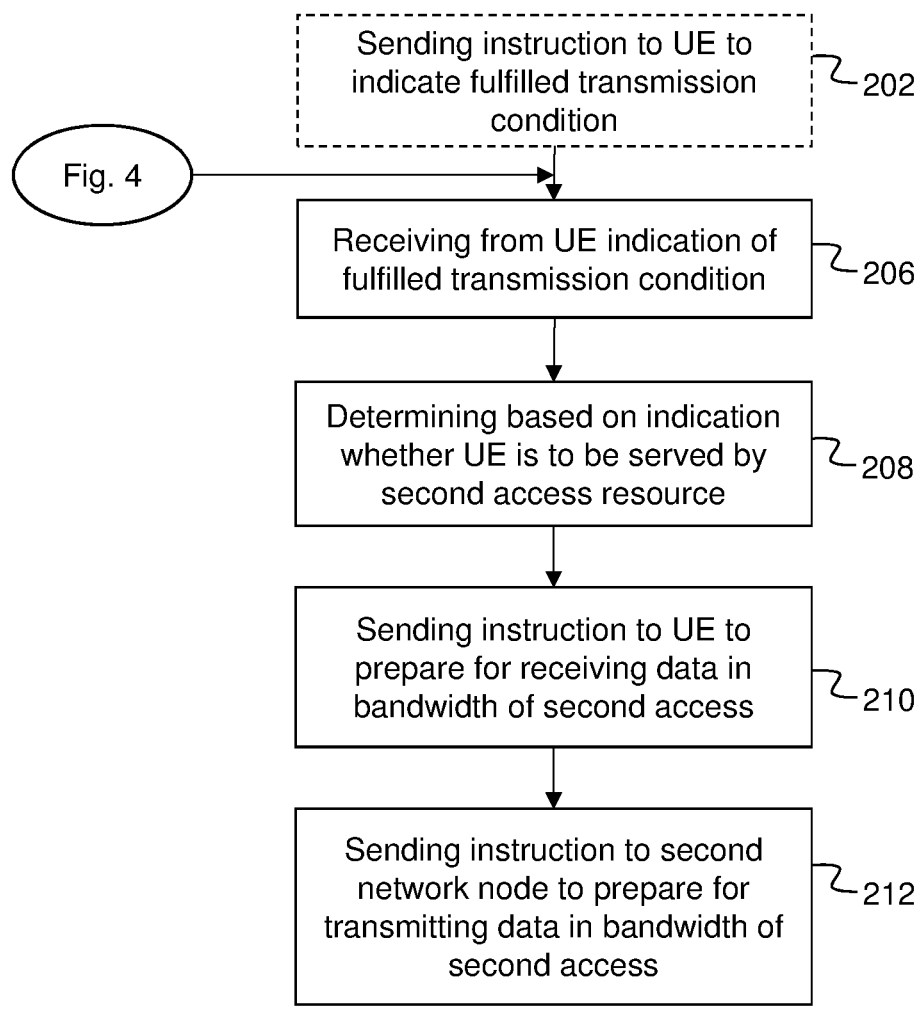
FIG. 3 is a flow chart illustrating a method performed by a first network node, according to possible embodiments.

FIG. 3 in conjunction with FIG. 2, shows an embodiment of a method performed by the first network node 110 for handling of the UE 150, which is connected to the first network node 110. The method comprises receiving 206, from the UE 150, an identity of the second network node 120, and an indication of a fulfilled transmission condition for transmission from the second transmission resource 140 to the UE 150, the indication being based on a transmission quality measurement performed by the UE 150 on a wireless signal transmitted by the first transmission resource 130. The method further comprises determining 208, based on the received second network node identity and on the received indication, whether the UE 150 is to be served by the second access technology transmission resource 140 of the second network node 120, and based on the result of the determining, sending 210 an instruction to the UE 150 to prepare for receiving data in a carrier bandwidth of the second access technology, and sending 212 an instruction to the second network node 120 to prepare for transmitting data from the second access technology transmission resource 140 in the carrier bandwidth of the second access technology.

In case the UE has performed a comparison between a value of the measurement and a pre-set threshold value, the indication of fulfilled transmission condition received from the UE may be an acknowledgement that the transmission condition is fulfilled for the second transmission resource. In case the UE has just measured a measurement value and has not performed a comparison, the indication sent by the UE is the actual measurement value. The transmission quality measurement performed by the UE may be e.g. a signal strength measurement, a signal quality measurement, signal to noise ratio, SNR, signal to interference and noise ratio, SINR, timing advance etc. or a combination thereof When the method has been performed, the second transmission resource of the second network node may be used as a secondary Cell of the UE, in addition to the primary Cell used between the first network node and the UE. The identity of the second network node may be a local identity that may need to be translated at the first network node to a most probable IP address in case there are globally more than one of the same local identity used. Further, when receiving the identity of the second network node, the first network node may determine, from information in e.g. a database, that the identity of the second network node corresponds to a network node having collocated transmission resources for a first and second access technology, and if this is the case, the first network node proceeds by determining, based on the received indication from the UE, whether the UE is to be served by the second access technology transmission resource of the second network node.

The received indication is an indication of whether a transmission condition is fulfilled for the second access technology even though it is based on measurements of a signal of the first access technology measurement. This means that the UE can be instructed to perform measurements on the first radio access technology at which it is already receiving data from the first network node. As a result, the UE does not have to leave the reception from the first network node, start its second access technology and receive a signal from the second network node at the second access technology to be able to determine the signal quality of the second access technology of the second network node. In one alternative, the first network node provides the UE with a transmission condition value for the second transmission resource, which transmission condition value reflects a difference between transmission quality of a signal received at the UE from the first transmission resource and transmission quality of a corresponding signal received at the UE from the second transmission resource, and the UE determines whether the measurement value of the signal from the first transmission resource is above the transmission condition value, and sends an indication of fulfilled transmission condition to the first network node. Alternatively, the network node only instructs the UE to send its measured value as it is. Then the indication sent by the UE is the actual measurement value, and the first network node uses the measurement value and the transmission condition value to determine whether the UE is to be served by the second access technology transmission resource of the second network node.

According to an embodiment, the determining 208 is based on the transmission quality measurement performed by the UE 150 on the wireless signal of the first transmission resource 130 and on a transmission condition value for the second transmission resource 140, which transmission condition value reflects a difference between transmission quality of the signal received at the UE from the first transmission resource and transmission quality of a corresponding signal received at the UE from the second transmission resource.

For example, let us say that a signal needs to have a signal strength of −100 dBm at the UE to have enough quality for the transmission resource sending the signal to be selected for serving the UE. However, an LTE signal received at the UE from an LTE transmission resource of the second network node that is −100 dBm can be translated to a corresponding NR signal received at the UE from an NR transmission resource of the second network node of −110 dBm. Then the transmission quality value that the LTE measurement is compared to for allowing the NR transmission resource to serve the UE should be 10 dB higher than for the LTE transmission resource. In other words, a compensation factor is to be used that reflects the difference between signal quality of a first transmission resource signal and a signal quality of a corresponding second transmission resource signal. The transmission condition value may be the compensation factor or the absolute value of the measurement that needs to be fulfilled for accepting signals from the second transmission resource, in the example above then −90 dBm. The UE may either send the actual measurement performed to the first network node, as the indication of fulfilled transmission condition and let the first network node use the transmission condition value in the determining step, or the UE may use a transmission condition value received from the first network node in order to determine and send in the indication, information whether the measured value fulfils the transmission condition value, as described below.

According to an embodiment, as described in FIG. 3, the method further comprises, prior to the receiving 206, sending 202 an instruction to the UE 150 to indicate the fulfilled transmission condition when the measurement performed by the UE 150 on the wireless signal transmitted by the first transmission resource 130 fulfils a transmission condition value for the second transmission resource 140, which transmission condition value reflects a difference between transmission quality of the signal received at the UE from the first transmission resource and transmission quality of a corresponding signal received at the UE from the second transmission resource. Hereby the UE is instructed to determine whether the measurement it has performed on the signal from the first transmission resource fulfils a condition value for the second transmission resource and report such a fulfilment to the first network node. As a result, the first network node can directly see whether the second transmission resource of the second network node has good enough transmission conditions and based on this information determine whether the second transmission resource of the second network node is to start transmitting data to the UE.

According to another embodiment, the method further comprises sending the transmission condition value for the second transmission resource to the UE 150. By the first network node sending the transmission condition value to the UE, the UE is instructed by the first network node to which threshold value to compare the measured transmission quality measurement.

Figure 4:
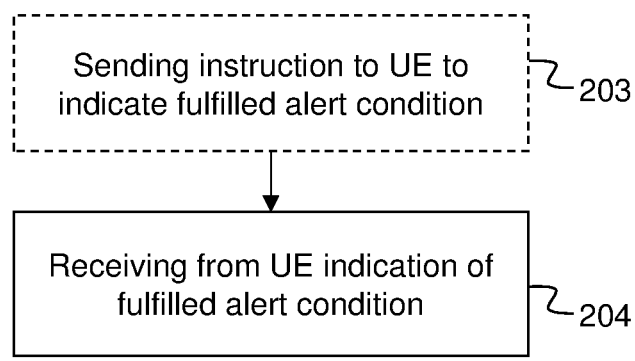
FIG. 4 is a flow chart illustrating a method performed by a first network node, according to further possible embodiments.

According to another embodiment, as shown in FIG. 4, which may be used together with the method described in FIG. 3, the method further comprises receiving 204, from the UE 150, an identity of the second network node 120, and an indication of a fulfilled alert condition for transmission from the second transmission resource 140 to the UE 150, the indication of fulfilled alert condition being based on a measurement performed by the UE 150 on the wireless signal transmitted by the first transmission resource 130, the alert condition being easier to fulfil than the transmission condition. By receiving such an indication of alert condition, the first network node is aware of that soon the UE may fulfil the transmission condition, i.e. the UE may be able to receive data from the second network node at the first carrier bandwidth of the second access technology.

According to an alternative, the method further comprises, in response to the reception 204 of the indication of fulfilled alert condition, sending an instruction to the second network node 120 to prepare for transmitting data from the second access technology transmission resource 140 at the carrier bandwidth of the second access technology. The second network node can then allocate network resources, turn on transmission resources in the second access technology, i.e. turn on transmission power, and/or change from sending a discovery signal to transmitting data, before the transmission condition is fulfilled. This means a shortened time from the transmission condition is fulfilled until data can be started to be sent from the second network node to the UE in the first carrier bandwidth of the second access technology.

According to an alternative of the embodiment latest embodiment described, the method may further comprise sending 203 an instruction to the UE 150 to indicate the fulfilled alert condition when the measurement performed by the UE 150 on the wireless signal transmitted by the first transmission resource 130 fulfils the alert condition value for the second transmission resource 140. According to an embodiment, the alert condition value may be send to the UE 150.

According to another embodiment, the first network node is arranged to transmit wireless signals to the UE 150 using the first access technology. The method further comprises transmitting wireless signals to the UE at a first carrier bandwidth of the first access technology and instructing the second network node 120 to transmit the wireless signal of the first transmission resource on which the measurement is to be performed by the UE 150 over the first carrier bandwidth. As the second network node transmits the first access technology signals on which the UE is to measure at the same bandwidth as the signals that are already transmitted from the first network node to the UE, the UE can quickly change from receiving signals from the first network node to receiving the measurement signals from the second network node. The UE does not even have to make any configuration change, it just continues receiving signals in the same bandwidth as it did from the first network node. This is in comparison to changing frequency band within the same access technology (inter frequency measurements), in which the UE needs some adjustment time before it can start receiving on the other frequency band, and to changing access technology that takes even longer adjustment time at the UE. The first network node may send the instructions to the second network node via an X2-interface, i.e. a direct connection between the first and the second network node.

Figure 5:
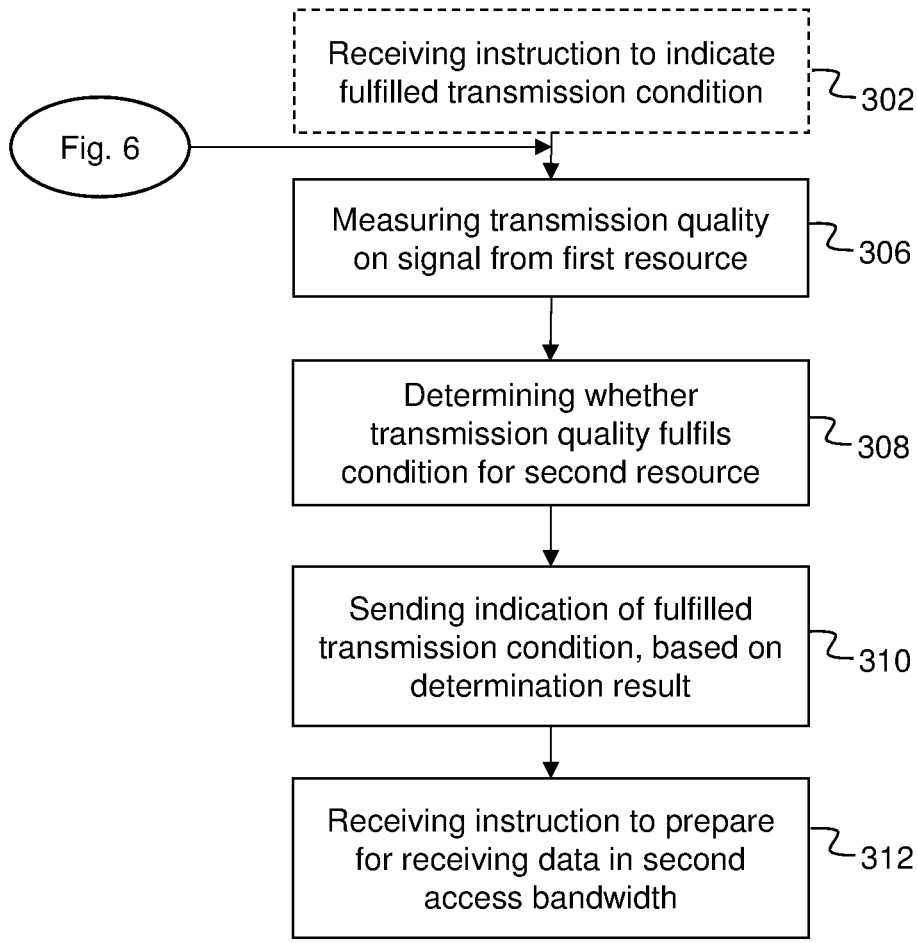
FIG. 5 is a flow chart illustrating a method performed by a UE, according to possible embodiments.

FIG. 5, in conjunction with FIG. 2, describes embodiments of a performed by a UE 150 wirelessly connected to a first network node 110 of a wireless communication network 100. The second network node 120 of the communication network has a first transmission resource 130 for wireless transmission using a first access technology and a second transmission resource 140 for wireless transmission using a second access technology, the first and the second transmission resources 130, 140 being collocated. The UE further has capabilities for receiving signals of the first access technology and for receiving signals of the second access technology. The method comprises measuring 306 transmission quality on a wireless signal received from the first transmission resource 130 of the second network node 120 and determining 308 whether the measured transmission quality fulfils a transmission condition for transmission from the second transmission resource 140 of the second network node 120 to the UE 150. The method further comprises sending 310 to the first network node 110, based on the result of the determining, an identity of the second network node 120 and an indication of fulfilled transmission condition for transmission from the second transmission resource 140 of the second network node 120 to the UE 150, and receiving 312 an instruction from the first network node 110 to prepare for receiving data in a carrier bandwidth of the second access technology.

According to an embodiment, the determining 308 is based on the transmission quality measurement performed by the UE 150 on the wireless signal of the first transmission resource 130 and on a transmission condition value for the second transmission resource 140, which transmission condition value reflects a difference between transmission quality of the signal received at the UE from the first transmission resource and transmission quality of a corresponding signal received at the UE from the second transmission resource.

According to an embodiment, the wireless signal received from the first transmission resource 130 of the second network node 120 is received at a first carrier bandwidth and wherein a signal received from the second transmission resource 140 of the second network node 120 is also received at the first carrier bandwidth. The signal received from the first transmission resource and the signal received from the second transmission resource may in this case be multiplexed in time and or frequency over the same first carrier bandwidth, in case the signals are to be sent simultaneously. This way measurements signals of the first access technology can be multiplexed with measurement signals of the second access technology so that UEs in the coverage of the second network node can use whichever of the measurement signals they find most suitable for the moment. For example, a second access technology only UE can use the second access technology measurement signal, a first access technology only UE can use the first access technology measurement signal and a UE that can use both access technologies and trying to find a secondary cell can use the same access technology measurement signal as the access technology it uses for its primary cell.

According to another embodiment, the method further comprises, prior to the measuring 306, receiving 302 an instruction from the first network node 110 to indicate the fulfilled transmission condition when the measured transmission quality on the wireless signal received from the first transmission resource fulfils a transmission condition value for the second transmission resource, which transmission condition value reflects a difference between transmission quality of the signal received at the UE from the first transmission resource and transmission quality of a corresponding signal received at the UE from the second transmission resource. According to an alternative, the method further comprises receiving the transmission condition value from the first network node 110.

Figure 6:
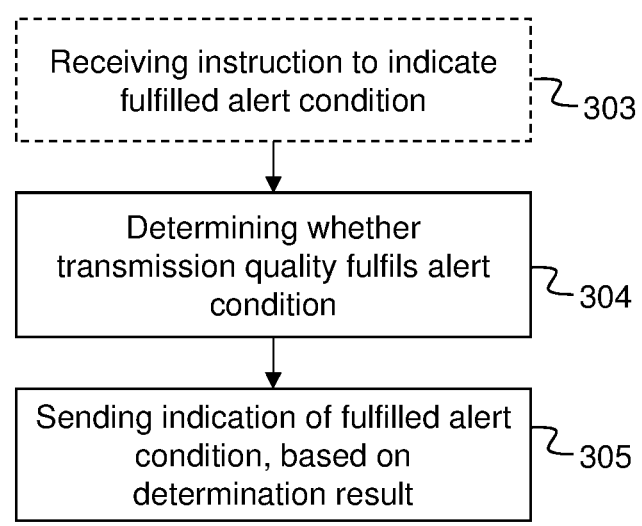
FIG. 6 is a flow chart illustrating a method performed by a UE, according to further possible embodiments.

According to an embodiment shown in FIG. 6, the method of any of the embodiments of FIG. 5 may further comprise determining 304 whether the measured transmission quality fulfils an alert condition for transmission from the second transmission resource 140 of the second network node 120 to the UE 150, and, based on the result of the determining, sending 305, to the first network node 110, an identity of the second network node 120, and an indication of fulfilled alert condition for transmission from the second transmission resource 140 of the second network node 120 to the UE 150, the alert condition being easier to fulfil than the transmission condition.

According to an alternative of the embodiment above, the method may further comprise receiving 303, from the first network node 110, an instruction to indicate the fulfilled alert condition when the measurement transmission quality on the wireless signal received from the first transmission resource 130 fulfils an alert condition value for the second transmission resource 140. According to an embodiment, the alert condition value may be received from the first network node 110.

Figure 7:
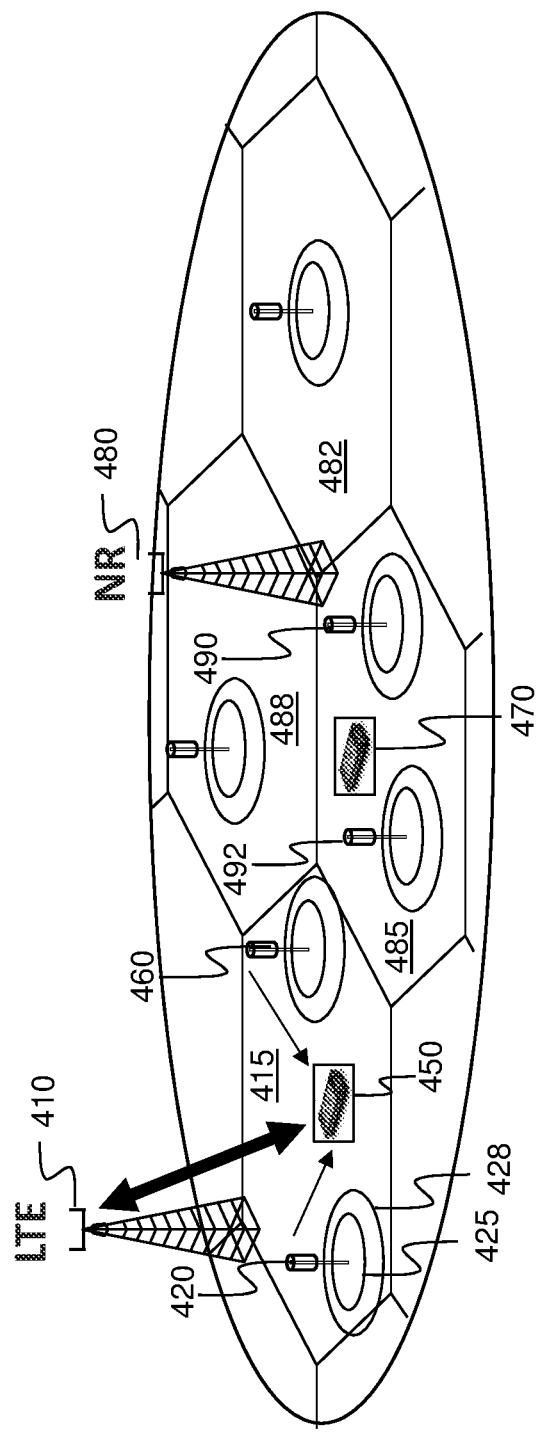
FIG. 7 is a schematic block diagram illustrating a communication scenario in which embodiments of the present invention may be used.

FIG. 7 shows an example of a wireless communication network in which the present invention can be used. The network comprises a first LTE macro base station 410 providing coverage in a first geographic cell 415. In the same part of the network there is also a first small base station 420. The first small base station 420 has LTE transmission resources for providing LTE coverage in a second cell 428 and NR transmission resources for providing NR coverage in a third cell 425. The LTE and NR transmission resources of the first small base station 420 are collocated. The third cell is here a little bit smaller than the second cell. Also, the second and third cells 425, 428 at least partly resides inside the first cell 415. There is also a second small base station 460 that also has collocated LTE and NR transmission resources. In the network there is UE 450 capable of receiving both LTE and NR transmissions moving around. The UE 450 is connected to the LTE macro base station 410 as its primary communication channel. According to an exemplary embodiment for use in this exemplary network, when the UE 450 needs extra resources for communication, for example when it is to receive large amount of data, the LTE macro base station starts looking for a secondary cell to be used for a secondary communication channel for the UE. The LTE macro base station 410 then instructs the UE 450 to measure on signals sent from the LTE transmission resource of the UE's neighboring base stations, in order to find a base station that the UE 450 can use as a secondary cell and secondary communication channel for dual connectivity. The UE is further instructed to determine whether any of the signals it receives is from a base station that can transmit both LTE and NR signals and if the received LTE signal has a transmission quality that is good enough for the UE to be able to receive a corresponding NR signal from the same base station. The UE 450 then receives signals from the LTE transmission resource of the first small base station 420 and from the LTE transmission resource of the second small base station 460. Both those signals are compared to a transmission condition value for the NR transmission resource, which transmission condition value reflects a difference between transmission quality of the LTE signal received at the UE and transmission quality of a corresponding NR signal received at the UE. The UE then determines that the transmission quality of the LTE signal of the first small base station 420 fulfils the transmission condition for NR transmission from the same first small base station 420. As the transmission condition for NR transmission was fulfilled for the first small base station 420, the UE 450 sends an identity of the first small base station 420 and an indication of a fulfilled transmission condition for NR transmission from the first small base station 420 to the LTE macro base station 410. Based on this, the LTE macro base station 420 determines whether the UE 450 is to be served by the NR transmission resource of the first small base station 420. The LTE macro base station 410 then sends an instruction to the UE 450 to prepare for receiving data in a NR carrier bandwidth, and sends an instruction to the first small base station 420 to prepare for transmitting data at the NR carrier bandwidth. Hereby, a secondary Cell, in the NR carrier bandwidth, has been rather quickly set up for the UE, even though this secondary Cell is on a different access technology than the primary Cell.

According to an embodiment, the LTE carrier bandwidth used by the first and second small base stations 420, 460 for sending the signals on which the UE 450 is to measure may be the LTE carrier bandwidth as the LTE macro base station 410 uses for the primary Cell. Hereby, intra frequency measurements is possible, i.e. measurements on the same carrier bandwidth for the signals of the small base stations as the UE already receives signals from the LTE macro base station 410. Intra frequency measurements have lower delay than inter frequency measurements or inter radio access technology measurements.

The LTE transmission resource of the first small base station can be a full supporting LTE transmission resource for regular LTE cell coverage. Alternatively, the LTE transmission resource can be selected to be as lean as possible as long as it allows a UE to detect and report transmission quality of LTE-signals sent from the first small base station. The lean LTE transmission resource can be achieved by using for example the LTE Discovery Reference Signal, or an LTE transmission resource with capabilities only to send at an LTE minimum bandwidth of e.g. 1.4 MHz, or a Lean carrier concept described in for example "A Lean Carrier for LTE" by Hoymann et al, published in IEEE Communication Magazine, pages 74-80, February 2013. The Lean carrier in the Lean carrier concept has minimized control channel overhead and cell-specific reference signals.

According to another embodiment, the signals sent from the first and second small base station 420, 460 on which the UE is to measure may be a mix of LTE and NR signals within the same carrier bandwidth. In other words, the LTE signal may be time and or frequency multiplexed with the NR signal. Hereby it is possible to send for example the LTE discovery signal and NR discovery signals at the same time (if frequency multiplexed) and by that allow the UE to use LTE to detect and use the same Transmission and reception point, TRxP.

According to an embodiment, in order for the measured transmission quality of the LTE-signal transmitted by the LTE transmission resources of the first and second small base stations to reflect a fulfilled transmission condition for transmission from the NR transmission resource of the first and second small base stations to the UE, a transmission condition value or threshold may be selected for the LTE signal that reflects the difference between LTE transmission quality and NR transmission quality. Alternatively, the transmission power of the LTE transmission resource of the small base stations may be adjusted to reflect the NR coverage. For example, the LTE transmission power of the small base stations is set so that there is a 1 to 1 relationship between the LTE measurements and corresponding NR measurements of signals from the same base station having collocated NR and LTE resources. This alternative is especially useful when the LTE transmission resource is used only for the purpose of quickly finding and evaluating NR transmissions using collocated LTE transmissions but less useful when the LTE transmissions are also used for regular transmissions to UEs in the small cell. The adjustment can for example be done to harmonize to NR coverage when beam forming is used for the NR transmissions.

Except for the UE indicating to the macro base station 410 a fulfilled transmission condition for transmitting NR signals from the first small base station 420 based on the measured LTE signals transmitted by the first small base station, the UE may also indicate a fulfilled alert condition. The alert condition is based on an alert condition value, the alert condition value being easier to fulfil than the transmission condition value. In other words, when the measured LTE signal fulfils the alert condition value, the UE 450 could signal to the macro base station 410 that I have an NR-capable small base station that is near to have a good enough coverage for serving me. Then the macro base station could prepare the UE and the first base station so that when/if the LTE signal from the small base station also fulfils the transmission condition value, the small base station could be up and running for serving the UE with a secondary Cell even more quickly.

The macro base station 410 knows from deployment information stored in the network comprising identities of each base station, and from the received identity of the small base station that the UE has detected that the detected small base station has collocated NR and LTE transmission resources. Also, the degree of NR coverage of the small base station can be judged based on the reported LTE transmission quality.

The network of FIG. 7 further comprises an NR macro base station 480 that provides coverage to three cells 482, 485, 488. In one of the cells 485 there are two small base stations 490 and 492 that each have both NR and LTE transmission capabilities. In macro cell 485 there is a second UE 470 residing having both NR and LTE reception capabilities. In a similar manner for the UE 450, the second UE 470 can have a primary connection towards the NR macro base station 480 and a secondary connection can be set up towards the LTE capabilities of any of the small base stations 490, 492, if the transmission quality of the NR transmissions of any of the small base stations 490, 492 fulfils transmission quality conditions for LTE transmission from the same small base station.

Figure 8:
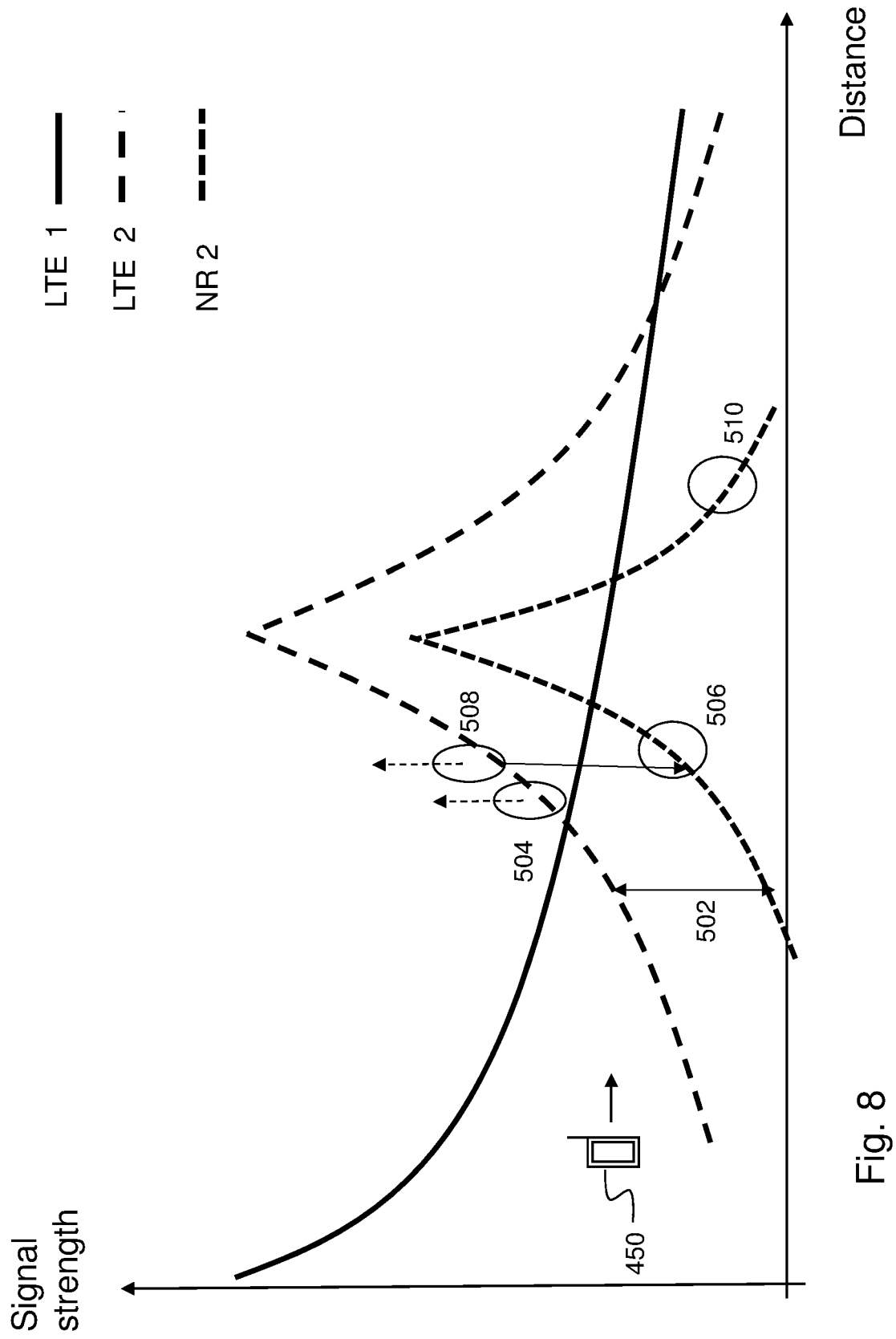
FIG. 8 is an x-y diagram illustrating an example of a procedure according to possible embodiments.

FIG. 8 is an x-y diagram illustrating embodiments of the present invention. In the figure, a UE 450 moves into a collocated LTE and NR cell (as illustrated by the arrow close to the UE in the diagram). As the UE 450 moves, the signal strength of the signal LTE 1 of the macro base station decreases illustrating that the UE moves away from the macro base station. LTE 1 in FIG. 8 signifies it is the macro base station that sends an LTE signal. LTE2 and NR2 in FIG. 8 signifies that it is the small base station 420 that sends an LTE signal as well as an NR signal. As shown in FIG. 8 there is a constant offset 502 in signal strength between the NR2 and LTE2 due to the collocation of the LTE and NR transmission resources in the small base station. As the UE 450 proceeds into the collocated LTE and NR cell, the LTE2 signal strength reaches an alert level 504 triggering preparation of the NR transmission resources of the small base station. As the UE 450 proceeds further into the collocated LTE and NR cell, the NR signal strength becomes good enough 506 for using the NR transmission resources of the small base station for serving the UE 450. This is indicated by the LTE2 signal strength reaching a transmission level 508 triggering set up of the NR transmission resources of the small base station for serving the UE. As the UE proceeds through the small collocated NR ad LTE cell, the signal strength eventually becomes too low for the small base station NR part to proceed serving the UE, and the macro base station instructs the small base station to stop its NR transmission to the UE 450.

Figure 9:
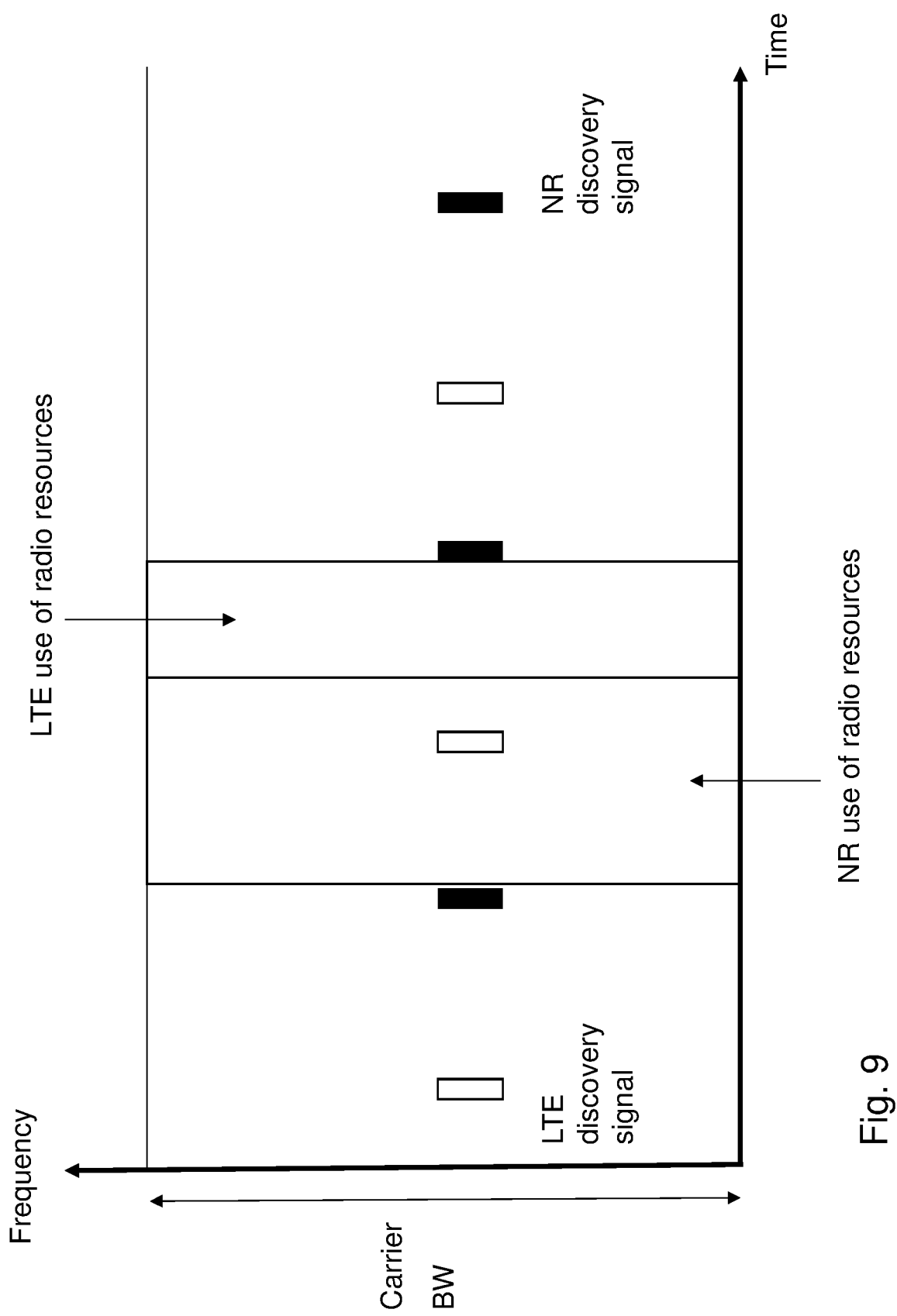
FIG. 9 is another x-y diagram illustrating an example of a procedure according to possible embodiments.

FIG. 9 shows an embodiment where a small base station sends LTE discovery signals and NR discovery signals time multiplexed on the same carrier bandwidth from a TRxP.

Even though the above example was described in the context of a heterogeneous network, i.e. with macro base station and small base stations (e.g. micro, pico and/or femto base stations) the invention is also applicable for non-heterogeneous networks. Also, even though the above example is described in the context of LTE and NR transmissions it might as well be used for other combinations of access technologies.

Figure 10:
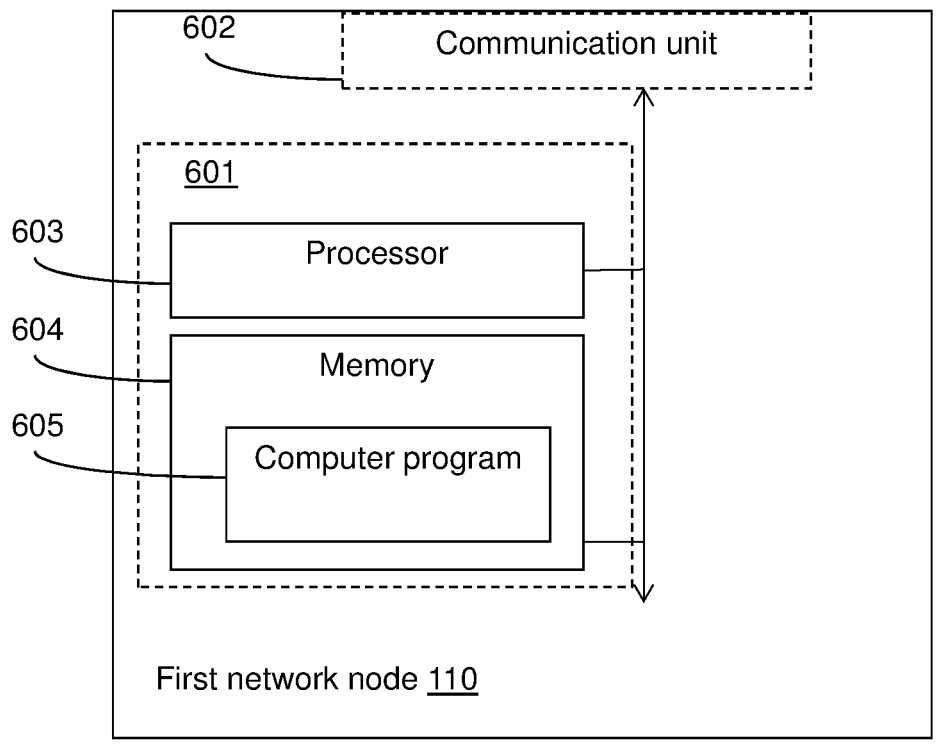
FIGS. 10-11 are schematic block diagrams illustrating a first network node in more detail, according to further possible embodiments.

FIG. 10, in conjunction with FIG. 2, shows a first network node 110 operable in a wireless communication system 100 configured for handling a UE 150 connected to the first network node 110, wherein a second network node 120 has a first transmission resource 130 for wireless transmission using a first access technology and a second transmission resource 140 for wireless transmission using a second access technology, the first and the second transmission resources 130, 140 being collocated. The first network node 110 comprises a processor 603 and a memory 604. The memory 604 contains instructions executable by said processor, whereby the first network node 110 is operative for receiving, from the UE 150, an identity of the second network node 120, and an indication of a fulfilled transmission condition for transmission from the second transmission resource 140 to the UE 150, the indication being based on a transmission quality measurement performed by the UE 150 on a wireless signal transmitted by the first transmission resource 130. The first network node 110 is further operative for determining, based on the received second network node identity and on the received indication, whether the UE 150 is to be served by the second access technology transmission resource 140 of the second network node 120, and based on the result of the determining, sending an instruction to the UE 150 to prepare for receiving data in a carrier bandwidth of the second access technology, and sending an instruction to the second network node 120 to prepare for transmitting data from the second access technology transmission resource 140 at the carrier bandwidth of the second access technology.

According to an embodiment, the first network node is further operative for sending an instruction to the UE 150 to indicate the fulfilled transmission condition when the measurement performed by the UE 150 on the wireless signal transmitted by the first transmission resource 130 fulfils a transmission condition value for the second transmission resource 140. The transmission condition value reflects a difference between transmission quality of the signal received at the UE from the first transmission resource and transmission quality of a corresponding signal received at the UE from the second transmission resource.

According to another embodiment, the first network node is further operative for sending the transmission condition value for the second transmission resource to the UE 150.

According to another embodiment, the first network node is further operative for receiving, from the UE 150, an identity of the second network node 120, and an indication of a fulfilled alert condition for transmission from the second transmission resource 140 to the UE 150. The indication of fulfilled alert condition is based on a measurement performed by the UE 150 on the wireless signal transmitted by the first transmission resource 130, the alert condition being easier to fulfil than the transmission condition.

According to another embodiment, the first network node is further operative for sending an instruction to the UE 150 to indicate the fulfilled alert condition when the measurement performed by the UE 150 on the wireless signal transmitted by the first transmission resource 130 fulfils the alert condition value for the second transmission resource 140.

According to another embodiment, the first network node 110 is further operative for, in response to the reception of the indication of fulfilled alert condition, sending an instruction to the second network node 120 to prepare for transmitting data from the second access technology transmission resource 140 at the carrier bandwidth of the second access technology.

According to another embodiment, the first network node is arranged to transmit wireless signals to the UE 150 using the first access technology, and the first network node is further operative for transmitting wireless signals to the UE at a first carrier bandwidth, and for instructing the second network node 120 to transmit the wireless signal of the first transmission resource on which the measurement is to be performed by the UE (150) over the first carrier bandwidth.

According to other embodiments, the first network node 110 may further comprise a communication unit 602, which may be considered to comprise conventional means for communicating with UEs such as the UE 150, such as wireless transceiver. The communication unit 602 may also comprise conventional means for communicating with the second base station 120, e.g. via wireline. The instructions executable by said processor 603 may be arranged as a computer program 605 stored e.g. in said memory 604. The processor 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above.

The computer program 605 may comprise computer readable code means, which when run in the first network node 110 causes the first network node 110 to perform the steps described in any of the described embodiments of the first network node 110. The computer program 605 may be carried by a computer program product connectable to the processor 603. The computer program product may be the memory 604. The memory 604 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 604. Alternatively, the computer program may be stored on a server or any other entity connected to the communication network to which the first network node 110 has access via the communication unit 602. The computer program may then be downloaded from the server into the memory 604.

Figure 11:
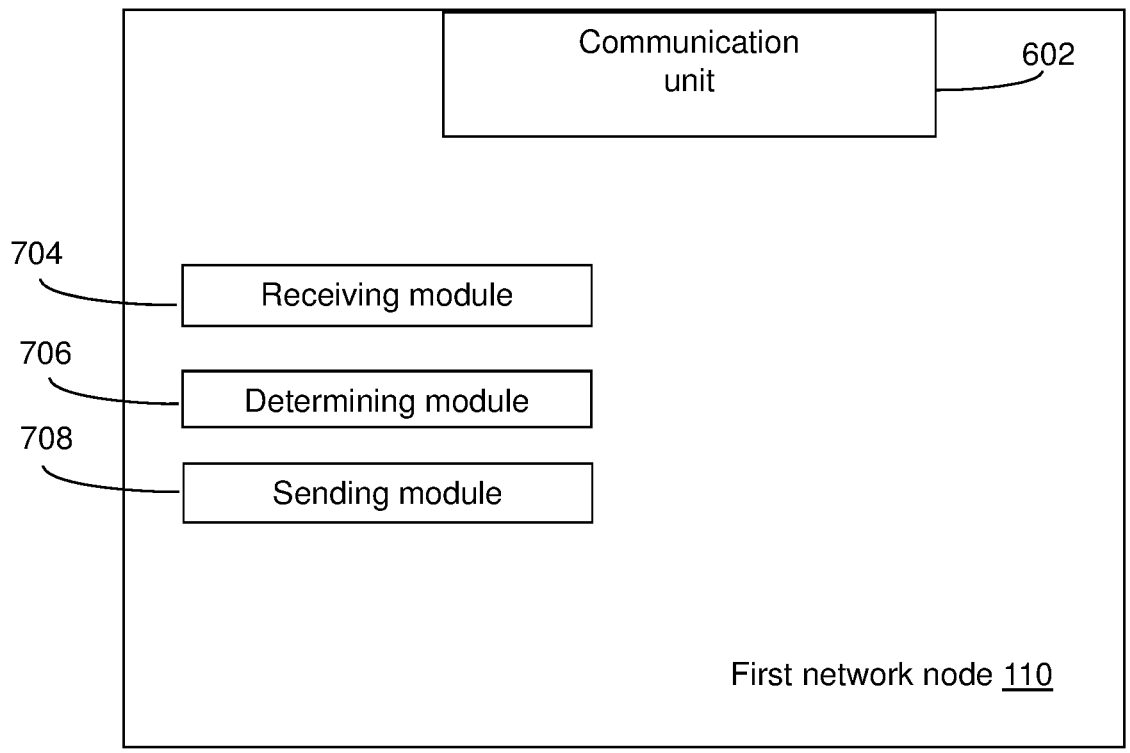

FIG. 11, in conjunction with FIG. 2, describes a first network node 110 operable in a wireless communication system 100 configured for handling a UE 150 connected to the first network node 110. A second network node 120 has a first transmission resource 130 for wireless transmission using a first access technology and a second transmission resource 140 for wireless transmission using a second access technology. The first and the second transmission resources 130, 140 are collocated. The first network node 110 comprises a receiving module 704 for receiving, from the UE 150, an identity of the second network node 120, and an indication of a fulfilled transmission condition for transmission from the second transmission resource 140 to the UE 150, the indication being based on a transmission quality measurement performed by the UE 150 on a wireless signal transmitted by the first transmission resource 130. The first network node 110 further comprises a determining module 706 for determining, based on the received second network node identity and on the received indication, whether the UE 150 is to be served by the second access technology transmission resource 140 of the second network node 120, and a sending module 708 for sending an instruction to the UE 150 to prepare for receiving data in a carrier bandwidth of the second access technology, based on the result of the determining, and for sending an instruction to the second network node 120 to prepare for transmitting data from the second access technology transmission resource 140 at the carrier bandwidth of the second access technology.

Figure 12:
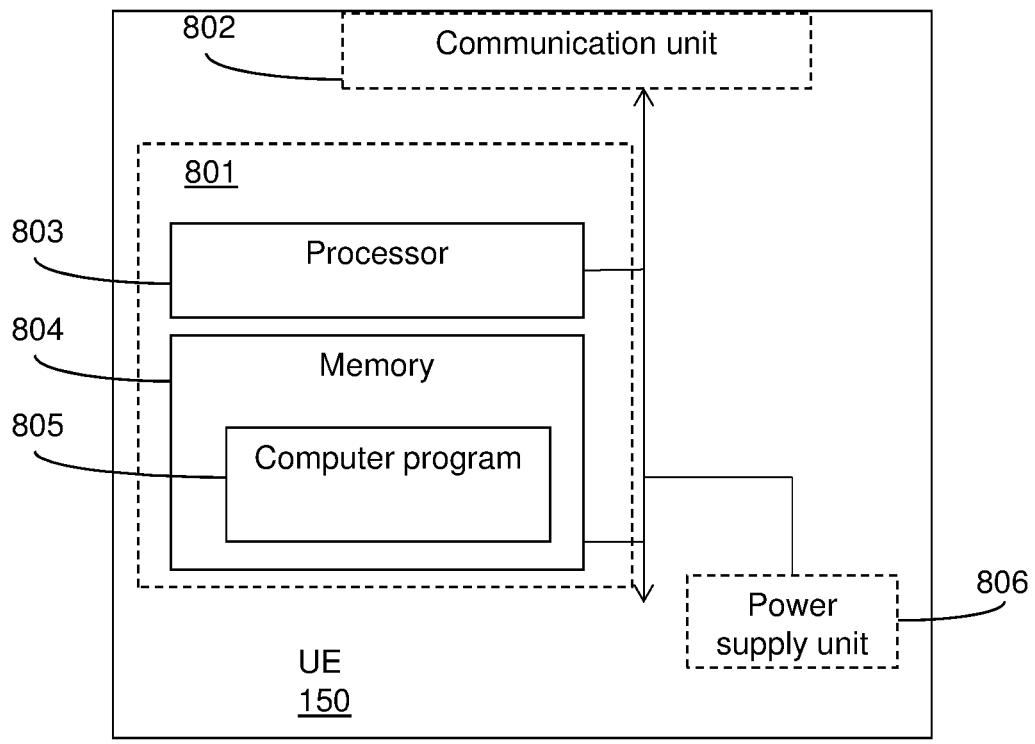
FIGS. 12-13 are schematic block diagrams illustrating a UE in more detail, according to further possible embodiments.

FIG. 12, in conjunction with FIG. 2, describes a UE 150 configured to be wirelessly connected to a first network node 110 of a wireless communication network 100, wherein a second network node 120 of the communication network has a first transmission resource 130 for wireless transmission using a first access technology and a second transmission resource 140 for wireless transmission using a second access technology. The first and the second transmission resources 130, 140 are collocated. The UE has capabilities for receiving signals of the first access technology and for receiving signals of the second access technology. The UE 150 comprises a processor 803 and a memory 804. The memory contains instructions executable by said processor, whereby the UE 150 is operative for measuring transmission quality on a wireless signal received from the first transmission resource 130 of the second network node 120, and determining whether the measured transmission quality fulfils a transmission condition for transmission from the second transmission resource 140 of the second network node 120 to the UE 150. The UE 150 is further operative for sending, to the first network node 110 based on the result of the determining, an identity of the second network node 120 and an indication of fulfilled transmission condition for transmission from the second transmission resource 140 of the second network node 120 to the UE 150, and receiving an instruction from the first network node 110 to prepare for receiving data in a carrier bandwidth of the second access technology.

According to an embodiment, the UE 150 is further operative for receiving the wireless signal from the first transmission resource 130 of the second network node 120 at a first carrier bandwidth and receiving a signal from the second transmission resource 140 of the second network node 120 also at the first carrier bandwidth.

According to another embodiment, the UE 150 is further operative for, prior to measuring the transmission quality on the wireless signal received from the first transmission resource 130, receiving an instruction from the first network node 110 to indicate the fulfilled transmission condition when the measured transmission quality on the wireless signal received from the first transmission resource fulfils a transmission condition value for the second transmission resource. The transmission condition value reflects a difference between transmission quality of the signal received at the UE from the first transmission resource and transmission quality of a corresponding signal received at the UE from the second transmission resource.

According to another embodiment, the UE 150 is further operative for receiving the transmission condition value from the first network node 110.

According to another embodiment, the UE 150 is further operative for determining whether the measured transmission quality fulfils an alert condition for transmission from the second transmission resource 140 of the second network node 120 to the UE 150, and for sending to the first network node 110, based on the result of the determining, an identity of the second network node 120, and an indication of fulfilled alert condition for transmission from the second transmission resource 140 of the second network node 120 to the UE 150, the alert condition being easier to fulfil than the transmission condition.

According to another embodiment, the UE 150 is further operative for receiving an instruction from the first network node 110 to indicate the fulfilled alert condition when the measurement transmission quality on the wireless signal received from the first transmission resource 130 fulfils an alert condition value for the second transmission resource 140.

According to other embodiments, the UE 150 may further comprise a communication unit 802, which may be considered to comprise conventional means for wireless communication from and/or to other nodes in the wireless network 100, such as the first network node 110 and the second network node 120. The communication unit 802 may comprise transmitting units for transmitting wireless signals and receiving units for receiving wireless signals. The instructions executable by said processor 803 may be arranged as a computer program 805 stored e.g. in said memory 804. The processor 803 and the memory 804 may be arranged in a sub-arrangement 801. The sub-arrangement 801 may be a micro-processor and adequate software and storage therefore, a Programmable Logic Device, PLD, or other electronic component(s)/processing circuit(s) configured to perform the actions and/or methods mentioned above. The UE may further comprise a power supply unit 806, such as a battery, for providing the UE with electrical power.

The computer program 805 may comprise computer readable code means, which when run in the UE 150 causes the UE to perform the steps described in any of the described embodiments of the UE. The computer program 805 may be carried by a computer program product connectable to the processor 803. The computer program product may be the memory 804. The memory 804 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 804. Alternatively, the computer program may be stored on a server or any other entity connected to the communication network to which the UE has access via the communication unit 802. The computer program may then be downloaded from the server into the memory 804.

Figure 13:
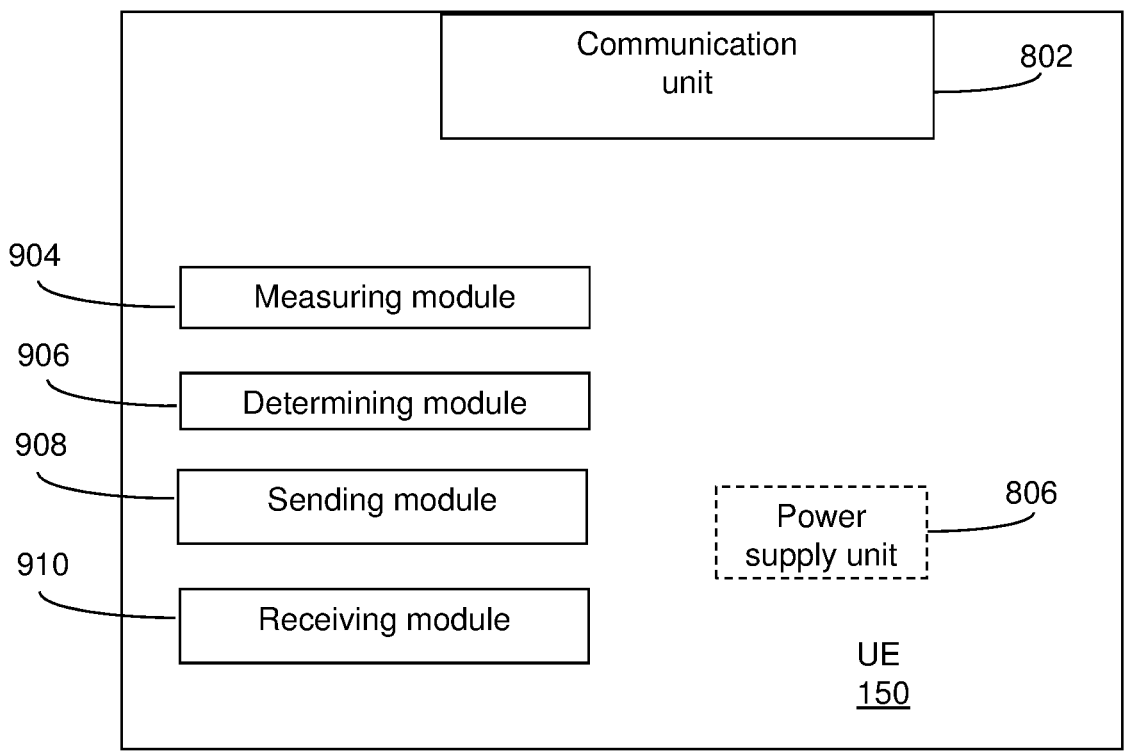

FIG. 13, in conjunction with FIG. 2, describes a UE 150 configured to be wirelessly connected to a first network node 110 of a wireless communication network 100, wherein a second network node 120 of the communication network has a first transmission resource 130 for wireless transmission using a first access technology and a second transmission resource 140 for wireless transmission using a second access technology. The first and the second transmission resources 130, 140 are collocated. The UE further has capabilities for receiving signals of the first access technology and for receiving signals of the second access technology. The UE 150 comprises a measuring module 904 for measuring transmission quality on a wireless signal received from the first transmission resource 130 of the second network node 120, and a determining module 906 for determining whether the measured transmission quality fulfils a transmission condition for transmission from the second transmission resource 140 of the second network node 120 to the UE 150. The UE 150 further comprises a sending module 908 for sending to the first network node 110, based on the result of the determining, an identity of the second network node 120 and an indication of fulfilled transmission condition for transmission from the second transmission resource 140 of the second network node 120 to the UE 150, and a receiving module 910 for receiving an instruction from the first network node 110 to prepare for receiving data in a carrier bandwidth of the second access technology. Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method performed by a first network node of a wireless communication system for handling of a user equipment (UE) connected to the first network node, wherein a second network node of the communication system has a first transmission resource for wireless transmission using a first access technology and a second transmission resource for wireless transmission using a second access technology, the first and the second transmission resources being collocated, the method comprising:
   receiving, from the UE, an identity of the second network node, and an indication of a fulfilled transmission condition for transmission from the second transmission resource to the UE, the indication being based on a transmission quality measurement performed by the UE on a wireless signal transmitted by the first transmission resource;
   determining, based on the received second network node identity and on the received indication, whether the UE is to be served by the second access technology transmission resource of the second network node; and,
   based on the result of the determining, sending an instruction to the UE to prepare for receiving data in a carrier bandwidth of the second access technology, and sending an instruction to the second network node to prepare for transmitting data from the second access technology transmission resource at the carrier bandwidth of the second access technology.

2. The method of claim 1, wherein the determining is based on the transmission quality measurement performed by the UE on the wireless signal of the first transmission resource and on a transmission condition value for the second transmission resource, which transmission condition value reflects a difference between transmission quality of the signal received at the UE from the first transmission resource and transmission quality of a corresponding signal received at the UE from the second transmission resource.

3. The method of claim 1, further comprising, prior to the receiving:
   sending an instruction to the UE to indicate the fulfilled transmission condition when the measurement performed by the UE on the wireless signal transmitted by the first transmission resource fulfils a transmission condition value for the second transmission resource, which transmission condition value reflects a difference between transmission quality of the signal received at the UE from the first transmission resource and transmission quality of a corresponding signal received at the UE from the second transmission resource.

4. The method of claim 3, further comprising sending the transmission condition value for the second transmission resource to the UE.

5. The method of claim 1, further comprising:
   receiving, from the UE, an identity of the second network node, and an indication of a fulfilled alert condition for transmission from the second transmission resource to the UE, the indication of fulfilled alert condition being based on a measurement performed by the UE on the wireless signal transmitted by the first transmission resource, the alert condition being easier to fulfil than the transmission condition.

6. The method of claim 5, further comprising:
   sending an instruction to the UE to indicate the fulfilled alert condition when the measurement performed by the UE on the wireless signal transmitted by the first transmission resource fulfils the alert condition value for the second transmission resource.

7. The method of claim 5, further comprising, in response to the reception of the indication of fulfilled alert condition, sending an instruction to the second network node to prepare for transmitting data from the second access technology transmission resource at the carrier bandwidth of the second access technology.

8. The method of claim 1, wherein the first network node is arranged to transmit wireless signals to the UE using the first access technology, the method further comprising:
- transmitting wireless signals to the UE at a first carrier bandwidth, and
- instructing the second network node to transmit the wireless signal of the first transmission resource on which the measurement is to be performed by the UE over the first carrier bandwidth.

9. A method performed by a user equipment (UE) wirelessly connected to a first network node of a wireless communication network, wherein a second network node of the communication network has a first transmission resource for wireless transmission using a first access technology and a second transmission resource for wireless transmission using a second access technology, the first and the second transmission resources being collocated, the UE further having capabilities for receiving signals of the first access technology and for receiving signals of the second access technology, the method comprising:
- measuring transmission quality on a wireless signal received from the first transmission resource of the second network node;
- determining whether the measured transmission quality fulfils a transmission condition for transmission from the second transmission resource of the second network node to the UE;
- based on the result of the determining, sending, to the first network node, an identity of the second network node and an indication of fulfilled transmission condition for transmission from the second transmission resource of the second network node to the UE; and
- receiving an instruction from the first network node to prepare for receiving data in a carrier bandwidth of the second access technology.

10. The method of claim 9, wherein the determining is based on the transmission quality measurement performed by the UE on the wireless signal of the first transmission resource and on a transmission condition value for the second transmission resource, which transmission condition value reflects a difference between transmission quality of the signal received at the UE from the first transmission resource and transmission quality of a corresponding signal received at the UE from the second transmission resource.

11. The method of claim 9, wherein the wireless signal received from the first transmission resource of the second network node is received at a first carrier bandwidth and wherein a signal received from the second transmission resource of the second network node is also received at the first carrier bandwidth.

12. The method of claim 9, further comprising, prior to the measuring:
- receiving an instruction from the first network node to indicate the fulfilled transmission condition when the measured transmission quality on the wireless signal received from the first transmission resource fulfils a transmission condition value for the second transmission resource, which transmission condition value reflects a difference between transmission quality of the signal received at the UE from the first transmission resource and transmission quality of a corresponding signal received at the UE from the second transmission resource.

13. The method of claim 11, further comprising receiving the transmission condition value from the first network node.

14. The method of claim 9, further comprising:
- determining whether the measured transmission quality fulfils an alert condition for transmission from the second transmission resource of the second network node to the UE;
- based on the result of the determining, sending, to the first network node, an identity of the second network node, and an indication of fulfilled alert condition for transmission from the second transmission resource of the second network node to the UE, the alert condition being easier to fulfil than the transmission condition.

15. The method of claim 14, further comprising receiving an instruction from the first network node to indicate the fulfilled alert condition when the measurement transmission quality on the wireless signal received from the first transmission resource fulfils an alert condition value for the second transmission resource.

16. A first network node operable in a wireless communication system configured for handling a user equipment (UE) connected to the first network node, wherein a second network node has a first transmission resource for wireless transmission using a first access technology and a second transmission resource for wireless transmission using a second access technology, the first and the second transmission resources being collocated, the first network node comprising a processor and a memory, said memory containing instructions executable by said processor, whereby the first network node is configured to:
- receive, from the UE, an identity of the second network node, and an indication of a fulfilled transmission condition for transmission from the second transmission resource to the UE, the indication being based on a transmission quality measurement performed by the UE on a wireless signal transmitted by the first transmission resource;
- determine, based on the received second network node identity and on the received indication, whether the UE is to be served by the second access technology transmission resource of the second network node; and
- based on the result of the determining, send an instruction to the UE to prepare for receiving data in a carrier bandwidth of the second access technology and send an instruction to the second network node to prepare for transmitting data from the second access technology transmission resource at the carrier bandwidth of the second access technology.

17. The first network node of claim 16, further being configured to send an instruction to the UE to indicate the fulfilled transmission condition when the measurement performed by the UE on the wireless signal transmitted by the first transmission resource fulfils a transmission condition value for the second transmission resource, which transmission condition value reflects a difference between transmission quality of the signal received at the UE from the first transmission resource and transmission quality of a corresponding signal received at the UE from the second transmission resource.

18. The first network node of claim 16, further being configured to:
- receive, from the UE, an identity of the second network node, and an indication of a fulfilled alert condition for transmission from the second transmission resource to the UE, the indication of fulfilled alert condition being based on a measurement performed by the UE on the wireless signal transmitted by the first transmission resource, the alert condition being easier to fulfil than the transmission condition.

19. The first network node of claim 18, further being configured to:
send an instruction to the UE to indicate the fulfilled alert condition when the measurement performed by the UE on the wireless signal transmitted by the first transmission resource fulfils the alert condition value for the second transmission resource.

20. The first network node of claim 18, further being configured to, in response to the reception of the indication of fulfilled alert condition, send an instruction to the second network node to prepare for transmitting data from the second access technology transmission resource at the carrier bandwidth of the second access technology.

21. The first network node of claim 16, further being configured to transmit wireless signals to the UE using the first access technology, the first network node further being configured to:
transmit wireless signals to the UE at a first carrier bandwidth, and
instruct the second network node to transmit the wireless signal of the first transmission resource on which the measurement is to be performed by the UE over the first carrier bandwidth.

22. A user equipment (UE) configured to be wirelessly connected to a first network node of a wireless communication network, wherein a second network node of the communication network has a first transmission resource for wireless transmission using a first access technology and a second transmission resource for wireless transmission using a second access technology, the first and the second transmission resources being collocated, the UE having capabilities for receiving signals of the first access technology and for receiving signals of the second access technology, the UE comprising a processor and a memory, said memory containing instructions executable by said processor, whereby the UE is configured to:
measure transmission quality on a wireless signal received from the first transmission resource of the second network node;
determine whether the measured transmission quality fulfils a transmission condition for transmission from the second transmission resource of the second network node to the UE;
based on the result of the determining, send, to the first network node, an identity of the second network node and an indication of fulfilled transmission condition for transmission from the second transmission resource of the second network node to the UE; and
receive an instruction from the first network node to prepare for receiving data in a carrier bandwidth of the second access technology.

23. The UE of claim 22, further being configured to receive the wireless signal from the first transmission resource of the second network node at a first carrier bandwidth and receive a signal from the second transmission resource of the second network node also at the first carrier bandwidth.

24. The UE of claim 22, further being configured to, prior to measuring the transmission quality on the wireless signal received from the first transmission resource, receive an instruction from the first network node to indicate the fulfilled transmission condition when the measured transmission quality on the wireless signal received from the first transmission resource fulfils a transmission condition value for the second transmission resource, which transmission condition value reflects a difference between transmission quality of the signal received at the UE from the first transmission resource and transmission quality of a corresponding signal received at the UE from the second transmission resource.

25. The UE of claim 22, further being configured to:
determine whether the measured transmission quality fulfils an alert condition for transmission from the second transmission resource of the second network node to the UE; and
based on the result of the determining, send, to the first network node, an identity of the second network node, and an indication of fulfilled alert condition for transmission from the second transmission resource of the second network node to the UE, the alert condition being easier to fulfil than the transmission condition.

26. The UE of claim 25, further being configured to receive an instruction from the first network node to indicate the fulfilled alert condition when the measurement transmission quality on the wireless signal received from the first transmission resource fulfils an alert condition value for the second transmission resource.

* * * * *